US009167563B2

(12) United States Patent
Hart et al.

(10) Patent No.: US 9,167,563 B2
(45) Date of Patent: Oct. 20, 2015

(54) SYSTEM AND METHOD FOR CARRIER AGGREGATION IMD CONTROL

(71) Applicant: Rogers Communications Inc., Toronto (CA)

(72) Inventors: George Maynard Hart, Campbellville (CA); Tak Wing Wan, Scarborough (CA)

(73) Assignee: ROGERS COMMUNICATIONS INC., Toronto, Ontario (CA)

( * ) Notice: Subject to any disclaimer, the term of this patent is extended or adjusted under 35 U.S.C. 154(b) by 200 days.

(21) Appl. No.: 13/798,695

(22) Filed: Mar. 13, 2013

(65) Prior Publication Data

US 2014/0003363 A1 Jan. 2, 2014

Related U.S. Application Data

(60) Provisional application No. 61/665,117, filed on Jun. 27, 2012.

(51) Int. Cl.
H04W 72/04 (2009.01)

(52) U.S. Cl.
CPC .......... *H04W 72/04* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2008/0102773 | A1* | 5/2008 | Buchwald et al. | 455/232.1 |
| 2011/0222444 | A1 | 9/2011 | Khlat et al. | |
| 2011/0310986 | A1* | 12/2011 | Heo et al. | 375/259 |
| 2012/0057553 | A1* | 3/2012 | Axelsson et al. | 370/329 |
| 2013/0115997 | A1* | 5/2013 | Immonen et al. | 455/522 |
| 2013/0177116 | A1* | 7/2013 | Wyville | 375/349 |
| 2013/0194987 | A1* | 8/2013 | Immonen et al. | 370/311 |
| 2013/0210364 | A1* | 8/2013 | Mayor et al. | 455/63.1 |
| 2013/0242939 | A1* | 9/2013 | Wagner | 370/331 |

OTHER PUBLICATIONS

3GPP TR 36.850 V0.4.0 (Aug. 2012), 3rd Generation Partnership Project; echnical Specification Group Radio Access Networks; Inter-band Carrier Aggregation Technical Report (Release 11), created on Jun. 8, 2012.

3GPP TR ab.cde V0.1.0 (Feb. 2012), 3rd Generation Partnership Project; Technical Specification Group Radio Access Networks; Inter-band Carrier Aggregation Technical Report (Release 11), dated Feb. 2012.

(Continued)

*Primary Examiner* — Ian N Moore
*Assistant Examiner* — Eric H Wang
(74) *Attorney, Agent, or Firm* — Rowand LLP

(57) ABSTRACT

Methods and devices are described for managing the use of system resources in a wireless network. In one aspect, a method is performed by a wireless network system associated with a wireless network. The method provides upstream communications from an electronic device to the wireless network. The method includes: identifying a set of carriers that may be used together without causing an intermodulation product that falls within one or more active pass-bands associated with a receiver of the electronic device; and scheduling a carrier aggregated upstream communication from the electronic device to the wireless network using the identified set of carriers, the carrier aggregated upstream communication being an orthogonal frequency division multiplexing communication.

14 Claims, 7 Drawing Sheets

(56) References Cited

OTHER PUBLICATIONS

3GPP TR 36.8xx V0.23.0 (Jan. 113, 2012), 3rd Generation Partnership Project; Technical Specification Group Radio Access Networks; Inter-band Carrier Aggregation Technical Report (Release 12), dated Jan. 2013.

CIPO, CA Office Action relating to application No. 2,809,585, dated Nov. 12, 2014.

* cited by examiner

SYSTEM AND METHOD FOR CARRIER AGGREGATION IMD CONTROL

TECHNICAL FIELD

The present disclosure relates to wireless network management and, more particularly, to methods of scheduling upstream communications to a wireless network.

BACKGROUND

Consumer equipment devices that operate within a wireless network are becoming ever-greater consumers of bandwidth. Users expect such electronic devices to allow them to access bandwidth-intensive technologies such as high-definition video streaming, video-based calling, etc.

To provide users access to very high bandwidth technologies over a wireless network, techniques may be required to increase the bandwidth available to a consumer equipment device. Carrier aggregation of downstream signals has been proposed in Long Term Evolution (LTE) Advanced networks to increase the bandwidth available for downstream communications to a consumer equipment device.

While carrier aggregation may be used to increase throughput, it may also result in an unwanted effect. More specifically, when carriers are aggregated, they may produce intermodulation distortion (IMD). This occurs when the carriers that are aggregated combine in non-linear network elements such as a power amplifier to form additional signals which may be referred to as IMD products. When an IMD product falls within a pass-band of a receiver that is in use on the consumer equipment device, a degraded reception problem may occur at the consumer equipment device. For example, a downstream communication to the consumer equipment device may experience interference due to the IMD product.

BRIEF DESCRIPTION OF THE DRAWINGS

Reference will now be made, by way of example, to the accompanying drawings which show example embodiments of the present application and in which.

Like reference numerals are used in the drawings to denote like elements and components.

DETAILED DESCRIPTION OF EXAMPLE EMBODIMENTS

In one aspect, disclosed is a method, performed by a wireless network system associated with a wireless network, for providing upstream communications from an electronic device to the wireless network. The method includes: identifying a set of carriers that may be used together without causing an intermodulation product that falls within one or more active pass-bands associated with a receiver of the electronic device; and scheduling a carrier aggregated upstream communication from the electronic device to the wireless network using the identified set of carriers, the carrier aggregated upstream communication being an orthogonal frequency division multiplexing communication.

In another aspect, disclosed is a node for providing communications within a wireless network. The node includes a scheduler configured to determine a schedule for using resources associated with the wireless network. The scheduler is configured to: identify a set of carriers that may be used together without causing an intermodulation product that falls within one or more active pass-bands associated with a receiver of an electronic device; and schedule a carrier aggregated upstream communication from the electronic device to the wireless network using the identified set of carriers, the carrier aggregated upstream communication being an orthogonal frequency division multiplexing communication.

In yet a further aspect, a non-transitory computer readable storage medium is described. The computer readable storage medium includes computer executable instructions (which may also be referred to as processor executable instructions which, when executed, cause a processor to: identify a set of carriers that may be used together without causing an intermodulation product that falls within one or more active pass-bands associated with a receiver of an electronic device; and schedule a carrier aggregated upstream communication from the electronic device to the wireless network using the identified set of carriers, the carrier aggregated upstream communication being an orthogonal frequency division multiplexing communication.

Other example embodiments of the present disclosure will be apparent to those of ordinary skill in the art from a review of the following detailed description in conjunction with the drawings.

Exemplary Wireless Network

Figure 1:
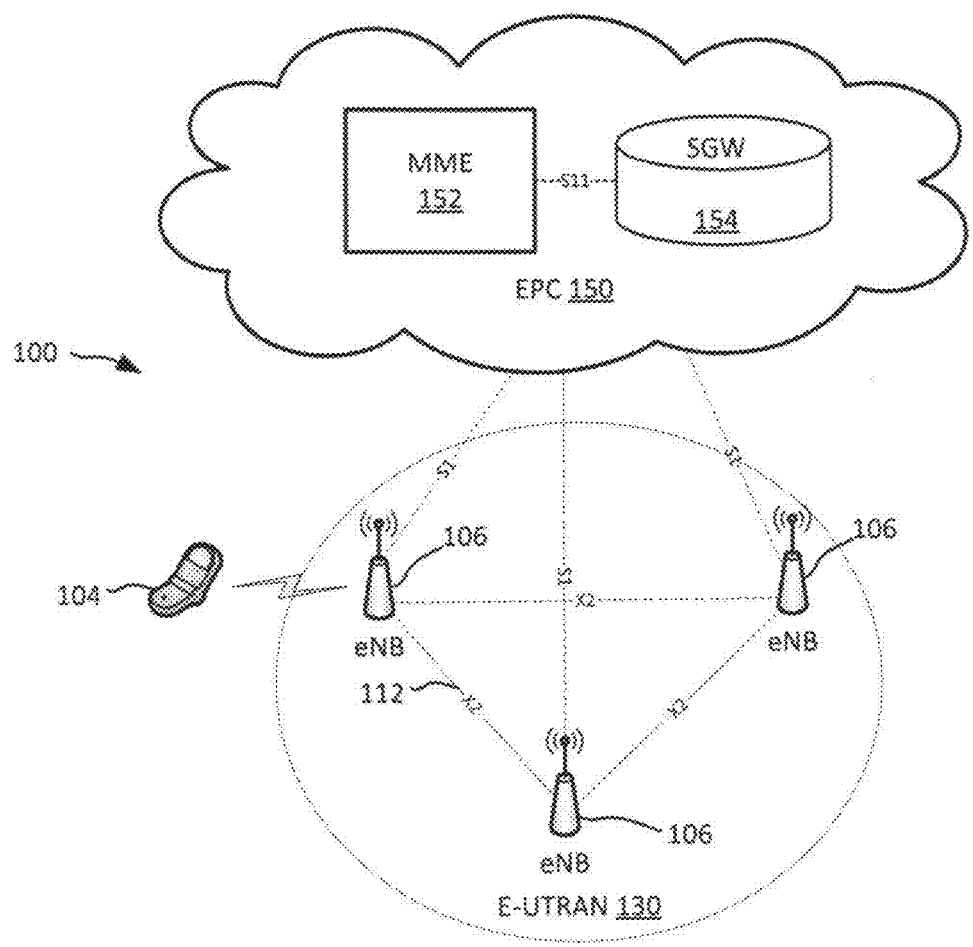
FIG. 1 is a block diagram of an exemplary wireless network in accordance with example embodiments of the present disclosure.

FIG. 1 is a block diagram of an exemplary wireless network 100. The wireless network 100 may be a subscriber network which is configured to provide subscription-based services to a plurality of consumer equipment (CE) devices 104. For example, the wireless network 100 may provide voice communication services to consumer equipment devices 104 operating within a coverage area provided by the wireless network 100. That is, the wireless network 100 may allow the consumer equipment device 104 to engage in voice-based communications, such as telephone calls, with other devices such as other smartphones, mobile phone, or landline-based telephones.

In at least some embodiments, the wireless network 100 may provide data communication services to the consumer equipment devices 104. For example, the wireless network 100 may allow consumer equipment devices 104 to send to and/or receive data from other devices or systems such as other consumer equipment devices 104 or servers. For example, the wireless network 100 may, in at least some embodiments, provide access to one or more public or private networks such as, for example, the Internet.

The consumer equipment devices 104 that operate within the wireless network 100 may take any one of a number of different forms. By way of example, the consumer equipment devices 104 may include smartphones, tablets, modems, computing devices, or consumer equipment devices 104 of another type.

The exemplary wireless network is a network that is configured to operate according to a 3rd Generation Partnership Project (3GPP) standard. 3GPP is a wireless industry standards organization that develops and maintains wireless network access technologies. In the example shown, the wireless network 100 is an LTE network (which may also be referred to as a 4G LTE wireless network 100). It will be appreciated, however, that the wireless network 100 may take other forms in other embodiments.

The exemplary wireless network 100 is an orthogonal frequency division multiplexing (OFDM) based wireless network 100. The OFDM-based wireless network 100 is, in at least some embodiments, a long-term evolution (LTE) network (which may also be referred to as a 4G LTE wireless network 100). LTE is a standard for wireless communication of high-speed data to consumer equipment (CE) 104.

The wireless network 100 may be allocated and operate over a defined set of frequencies. Typically, a wireless spectrum is divided up into discrete sets of bands and a specific wireless network 100 may only be permitted to operate using a specific band or set of bands. These bands may be LTE bands. That is, the wireless network 100 may utilize band specifications that are a part of the LTE standard. For example, in at least some embodiments, the wireless network 100 may utilize LTE band 7. LTE band 7 is an operating band which is assigned an uplink frequency range of 2500 MHZ to 2570 MHZ and a downlink frequency range of 2620 MHZ to 2690 MHZ. In some embodiments, the wireless network 100 may utilize LTE band 20. LTE band 20 is an operating band which is assigned an uplink frequency range of 832 MHZ to 862 MHZ and a downlink frequency range 791 MHZ to 821 MHZ. By way of further example, in some embodiments, the wireless network 100 may utilize LTE band 17, which is assigned an uplink frequency range of 704 MHZ to 716 MHZ and a downlink frequency range of 734 MHZ to 746 MHZ. By way of further example, in some embodiments, the wireless network may utilize LTE band 4, which is assigned an uplink frequency range of 1710 to 1755 MHz and a downlink frequency range of 2110 to 2155 MHz. It will be appreciated that the specific sets of bands that are mentioned above (LTE bands 7, 17 and 20) are not an exhaustive list of the bands which may be utilized by the wireless network 100 and that the wireless network 100 may utilize other bands apart from those specifically listed.

In at least some embodiments, the wireless network may be allocated spectrum associated with a plurality of LTE bands. That is, the wireless network 100 may operate on multiple LTE bands. For example, in some embodiments, the wireless network 100 may operate on LTE band 4 and also on LTE band 17. Typically, the wireless network 100 will not be permitted to operate over all LTE bands. That is, it typically operates over a specific set of LTE bands which its operating body has been assigned (e.g. in a spectrum auction).

As noted above, the wireless network 100 may be an OFDM-based wireless network 100 which is configured to use orthogonal frequency division multiplexing to convey data. More particularly, using OFDM, digital data may be conveyed on multiple carrier frequencies. In OFDM, a serial digital data stream is split into multiple slower data streams and then each of these data streams is modulated onto a separate sub-carrier. A sub-carrier is a tone or resource element. In LTE systems, 15 kHz tones are used as sub-carriers. The modulation may be any form of modulation that may be used with digital data including, for example, quadrature amplitude modulation (QAM), binary phase-shift keying (BPSK) or quadrature phase-shift keying (QPSK). For example, in at least some embodiments, the data may be modulated using sixty-four state QAM (64 QAM). However, other modulation techniques may also be used.

The architecture of the exemplary wireless network may be a System Architecture Evolution (SAE)-based architecture. An SAE-based architecture is one that uses the core network architecture of the 3GPP LTE wireless communication standard.

The wireless network 100 includes a radio access network which, in the example illustrated, is an Evolved Universal Mobile Telecommunications System (UMTS) Terrestrial Radio Access Network 130, which may be abbreviated as E-UTRAN.

As illustrated, the wireless network 100 includes a plurality of nodes 106 within the radio access network. These nodes 106 are, in at least some embodiments, Evolved Node B nodes 106, which may also be referred to as Evolved Universal Terrestrial Radio Access (e-UTRAN) Node B nodes 106. Evolved Node B is sometimes abbreviated as eNodeB or eNB and is referred to as eNB in the exemplary wireless network 100 of FIG. 1. The nodes 106 are hardware components which are connected with the mobile phone network that communicates with the consumer equipment devices 104. The nodes 106 may also be referred to as access points or base stations.

The wireless network 100 includes multiple nodes 106. In the example illustrated, three eNodeB nodes are illustrated. In practice the number of nodes 106 may be much greater. The number of nodes that are required will depend on the coverage area of the wireless network 100, the number of consumer equipment devices 104 operating in the wireless network 100 and the quantity of bandwidth expected to be consumed by such consumer equipment devices 104. The nodes 106 may have differing coverage areas so that when a consumer equipment device 104 is located at a given location, it may communicate with one of the nodes 106 but may be outside of the coverage area of at least one other of the nodes 106.

The nodes 106 are communicably connected to one another. In the example illustrated, an X2 interface 112 exists between the nodes 106. This interface 112 is a direct communication link between the nodes 106. This interface 112 may be used to handle control plane and user plane traffic. For example, it may be used during handover (e.g. as the consumer equipment device 104 travels from an area in which it communicates with one node 106 to an area where it communicates with a different node 106).

The wireless network 100 includes other components which may, for example, facilitate communications with the Internet or with telephones connected to a public switched telephone network. In the example illustrated, the nodes 106 are connected to an Evolved Packet Core (EPC) 150 which may also be referred to as a System Architecture Evolution (SAE) core. The EPC 150 includes a Mobility Management Entity (MME) 152. The MME 152 is a control node for the wireless network 100. In at least some embodiments, the MME 152 is responsible for tracking consumer equipment devices 104. The MME 152 may also, in at least some embodiments, authenticate consumer equipment devices 104. The MME 152 may provide other functions apart from those discussed herein.

The EPC 150 also includes one or more gateways. In the example illustrated, a Serving Gateway (SGW) 154 is illustrated. The SGW 154 may, among other things, forward and route user data packets. While not specifically illustrated, the EPC 150 may also include a Packet Data Network Gateway (PGW or PDNGW). The PGW provides connectivity from the consumer equipment devices 104 to external packet networks and acts as a point of exit and entry of traffic for the consumer equipment devices 104. For example, the PGW may connect to the Internet and may provide the consumer equipment devices 104 with access to the Internet.

The EPC 150 is connected to the radio access network. More particularly, the nodes 106 are connected to the EPC 150. Thus, the nodes 106 act as access points which provide radio access to the consumer equipment devices 104 and the EPC 150 is engaged for various tasks such as management and communication-related tasks.

In at least some embodiments, the wireless network 100 may be configured to allow for carrier aggregated communications. In at least some embodiments, downstream communications (i.e. communications to the consumer equipment devices 104) may be carrier aggregated and, in at least some embodiments, upstream communications (i.e. communications from the consumer equipment devices 104 to the wireless network 100) may be carrier aggregated. Carrier aggregation may be used, for example, in LTE-Advanced. LTE Advanced is an enhancement of the LTE standard.

Carrier aggregation allows transmission bandwidths to be increased over those that can be supported by a single carrier or channel. This allows very high data rates to be achieved. More particularly, carrier aggregation involves utilizing two or more carriers.

While carrier aggregation may be used to increase throughput, it may also result in an unwanted effect. More specifically, when carriers are aggregated, they may produce intermodulation distortion (IMD). This occurs when the carriers that are aggregated combine in a non-linear network element such as an amplifier or coupler to form additional signals which may be referred to as IMD products. When an IMD product falls within a pass-band of a receiver that is in use on the consumer equipment device, a reception fidelity problem may occur at the consumer equipment device. For example, a downstream communication to the consumer equipment device may experience interference due to the IMD product. IMD may be generated in the transmitter path in the consumer equipment device 104. Since the transmitter path and receiver path typically share a common antenna due to space constraints in the device, IMD products generated by the transmitter path may enter the receiver path. It will be appreciated that IMD problems may also arise within nodes 106 (i.e. at the wireless network side) if a shared antenna structure is used in such nodes 106.

Carrier aggregation may, in at least some embodiments, be achieved as intra-band carrier aggregation. This type of carrier aggregation occurs when the carriers that are being aggregated are members of the same radio frequency band. When carrier aggregation is performed using carriers that are all within the same LTE band (i.e. when intra-band carrier aggregation is performed), then the IMD products should not create a problem (i.e. they should fall outside of the receiver pass-band of a receiver in use at the consumer equipment device).

Carrier aggregation may also be performed as inter-band carrier aggregation. Inter-band carrier aggregation occurs when a carrier of one band is aggregated with one or more carriers of another band. When carrier aggregation is performed by aggregating carriers from multiple LTE bands, then the IMD products may, in some circumstances, be problematic (i.e. they may fall within the receiver pass-band of a receiver in use at the consumer equipment device 104). By way of example, some carriers associated with LTE band 17 may result in an IMD product that falls within the receiver pass-band of a receiver in use at the consumer equipment device 104 when aggregated with certain carriers of LTE band 4. For simplicity, a pair of bands which contain some carriers that, when aggregated, cause an IMD product falling within a pass-band of an in-use receiver at a consumer equipment device 104 may be referred to as an IMD unfriendly band pair. Conversely, a pair of bands that do not have any carriers that, when aggregated, cause an IMD product falling within a pass-band of an in-use receiver at a consumer equipment device 104 may be referred to as an IMD friendly band pair. An IMD product that falls within an active pass-band of a receiver may be referred to herein as a "problematic IMD product." That is, the term "problematic IMD product" refers to an IMD product that falls within the downlink frequency range that is being monitored at the same consumer equipment device (104) which caused the IMD product to be generated.

As will be described in greater detail below, carrier aggregation may be achieved by aggregating carriers of an IMD unfriendly band pair. That is, even if a carrier that is a member of a first band and a carrier that is a member of a second band may cause a problematic IMD product, certain other carriers of the first band may be aggregated with certain other carriers of the second band without causing a problematic IMD product. Thus, rather than simply assessing IMD products at the band level (i.e. rather than simply determining that a band pair is an IMD unfriendly band pair and refraining from performing carrier aggregation using that band pair), IMD products may be assessed at the carrier level. That is, each carrier of one of the bands of the IMD unfriendly band pair may be evaluated together with each carrier of the other one of the bands of the IMD unfriendly band pair to identify the specific carriers which, when used simultaneously, cause a problematic IMD product.

By identifying the pairs of carriers which cause a problematic IMD product when carrier aggregation is performed using those carriers, carrier aggregation using those pairs may be avoided (or may be performed in a way that avoids the IMD problem). That is, if a combination of carriers is determined to be IMD unfriendly (i.e. if that combination causes a problematic IMD product when the carriers in the combination are used at consumer electronic device (104)), then a special technique may be used to avoid either the generation of the problematic IMD product or the reception of the problematic IMD product.

More particularly, in some embodiments, an IMD unfriendly combination of carriers may simply be avoided for the purposes of carrier aggregation. That is, the specific carriers that cause the problematic IMD product are, in some embodiments, not aggregated in the problematic combination. More particularly, the carriers that are included in a combination of carriers that causes a problematic IMD product may not be aggregated together. In such embodiments, no electronic device will be scheduled to use all of the carriers in the IMD unfriendly combination concurrently. By avoiding concurrent use of carriers that are known to cause a problematic IMD product, the problematic IMD product is not generated.

In other embodiments, an IMD unfriendly combination of carriers may be used but may be handled in a special way that avoids the problematic IMD product. For example, in some embodiments, the carriers that are included in an IMD unfriendly combination of carriers may be used for upstream communications from a single electronic device, but may be separated by time in such use. That is, at least one carrier in the IMD unfriendly combination may be used with a different transmission timeframe. For example, a first carrier from the combination may be used in a radio subframe first time slot and a second carrier may be used in a radio subframe second time slot. Since the carriers are not used concurrently, the IMD product problems are avoided.

A further technique that allows an IMD unfriendly combination of carriers involves allowing all carriers of the IMD unfriendly combination to be used at the same time (i.e. during a common radio subframe time slot) for upstream carrier aggregation from a consumer equipment device 104, but to ensure that no downstream data packets are sent to that consumer equipment device 104 during that time (i.e. during that radio subframe time slot). That is, a scheduler that is scheduling the use of network resources may schedule an upstream carrier aggregated communication in which all carriers of an IMD unfriendly combination are used at the same time on a single consumer equipment device, but may ensure that no downstream communications are scheduled to that same consumer equipment device at that time. Accordingly, IMD unfriendly combinations of carriers may be specially handled by scheduling resources to avoid coincident transmission and reception of signals at the consumer equipment device 104 which would suffer IMD problems (i.e. the device that is using the IMD unfriendly carrier combinations for upstream communications). Using this technique, the receiver of the consumer equipment device would still receive the problematic IMD product, but it would not interfere with any downstream communications since that consumer equipment device would not be scheduled to receive a resource block at that time and the consumer equipment device would treat the resource block as though it were destined for another device. A resource block is a set of subcarriers for a brief period of time. In an LTE system, a resource block consists of 12 subcarriers spaced 15 kHz apart totalling 180 kHz for a period of 0.5 ms.

Another technique that allows an IMD unfriendly combination of carriers to be used involves turning off the receiver of the electronic device while the IMD unfriendly combination of carriers is being used for upstream carrier aggregation. That is, while an electronic device utilizes an IMD unfriendly combination of carriers for upstream carrier aggregation, the receiver may be briefly temporary turned off. More particularly, the receiver is turned off during the specific time slot in which the carriers in the IMD unfriendly combination are all used. This technique effectively avoids the reception of the problematic IMD product—the IMD product is still generated, but it is not detected since the receiver is briefly turned off.

Thus, combinations of carriers that are IMD unfriendly may be handled in a special way. In contrast, the pairs (or higher-order combinations) of carriers which are determined not to cause a problematic IMD product when aggregated may be used for carrier aggregation without having to employ one of the techniques that are used to address the IMD problems of IMD unfriendly combinations discussed above. More particularly, all carriers of an IMD friendly carrier combination may be used simultaneously at a single electronic device while the receiver of that electronic device is left on and the electronic device is able to receive on all available resource blocks without constraint. That is, when using an IMD friendly carrier combination, a schedule may be created in which a single electronic device is scheduled to use all carriers in the combination at the same time (i.e. during a common radio subframe time slot) for upstream carrier aggregation and in which a downstream signal may also be transmitted to that electronic device during that same time (i.e. during that same radio subframe time slot) and may be received at that electronic device (since the receiver is permitted to remain on).

Thus, evaluating IMD product at the carrier level allows carrier aggregation to be achieved across an IMD unfriendly band pair. Combinations of carriers that are IMD friendly (i.e. that do not cause a problematic IMD product) may, for the purpose of carrier aggregation, be treated differently than combinations of carriers that are IMD unfriendly (i.e. that cause a problematic IMD product).

Figure 2:
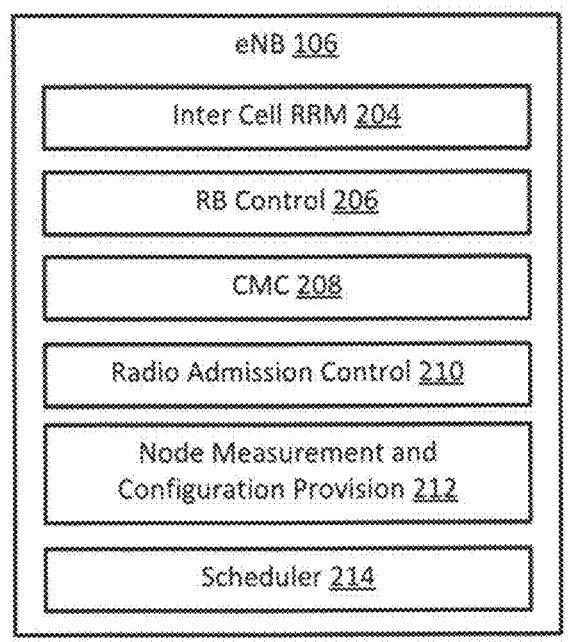
FIG. 2 is a block diagram of an exemplary node in accordance with example embodiments of the present disclosure.

Referring now to FIG. 2, an example node 106 will be described in greater detail. The example node 106 is an eNB node. The node 106 is configured to perform a number of functions. Some of these functions will now be discussed with reference to a number of functional components that may be included in the node 106. For example, as illustrated in FIG. 2, the eNB node may include an Inter Cell Radio Resource Management (RRM) component 204. The Inter Cell RRM component 204 is used to achieve coordination among nodes 106 within the radio network. Since the same frequency may be used by a neighboring cell (i.e. by adjacent nodes 106), the Inter Cell RRM may be used to avoid signal interference between adjacent cells. For example, the Inter Cell RRM component 204 may coordinate resource allocation and/or power adjustment in the node 106 with that of other nodes 106 to avoid interference.

The node 106 also includes a radio bearer (RB) control component 206. The RB control component 206 is used to establish, maintain and release radio bearers. The RB control component 206 may consider the overall resource situation in the E-UTRAN, Quality of Service (QoS) requirements, and other factors in order to maintain radio bearers. The RB control component 206 may, for example, release radio resources associated with radio bearers at session termination, handover, etc.

The node 106 further includes a Connection Mobility Control (CMC) component 208. The CMC component 208 manages radio resources in connection with idle or connected mode mobility.

The node 106 may further include a Radio Admission Control component 210. The Radio Admission Control component 210 is used to determine whether to accept a new radio resource control connection based on resource usage in a cell and the resource requirements of services. When there is a resource shortage in a cell, the radio admission control component 210 may identify a radio resource control connection or a radio bearer that should be released to reduce network congestion.

The node 106 may also include a node measurement and configuration provision component 212. This component may perform various measurements and may provide the results to operators or control entities to ensure that radio resource usage and network configuration is optimized. By way of example, error radio information may be delivered to an operation, administration and maintenance entity to help identify problems in the wireless network 100.

The node 106 further includes a scheduler 214. The scheduler may also be referred to as a dynamic resource allocation component. The scheduler 214 attempts to maximize radio efficiency by dynamically allocating radio resources. The scheduler 214 may be used to allocate radio resources for upstream communications from a consumer equipment device 104 to the wireless network 100 and also to allocate radio resources for downstream communications from the wireless network 100 to a consumer equipment device 104. As will be described in greater detail below, in at least some embodiments, the scheduler 214 is configured to allocate radio resources for a carrier aggregated upstream communication. When allocating such radio resources, the scheduler 214 is configured to select carrier combinations which will not cause a problematic IMD product.

As would be understood by a person of skill in the art, while the various components of the node 106 were discussed separately, these components may not be physically separate and distinct in all embodiments. That is, two or more of the components described above (e.g. the inter cell RRM component 204, the RB control component 206, the CMC component 208, the radio admission control component 210, the node measurement and configuration provision component 212 and/or the scheduler 214) may be provided by common hardware. Thus, the components described above may be functional components provided in a hardware-based node 106.

The node 106 may include one or more processors and memory. The memory may include processor-executable instructions that, when executed, causes the processor to perform one or more of the functions described with reference to the components described above. Accordingly, the node 106 and/or any of the components, features or systems of the node 106 discussed herein, in at least some embodiments, include one or more processors and one or more memory elements storing processor executable instructions. In at least some embodiments, the node 106 and/or any of the components, features or systems of the node 106 may operate under stored program control and execute the processor executable instructions stored on the memory element(s). For example, the inter cell RRM component 204, the RB control component 206, the CMC component 208, the radio admission control component 210, the node measurement and configuration provision component 212 and/or the scheduler 214 may be implemented on a processor. In at least some embodiments, the scheduler 214 may be provided by a processor of the node 106 that is configured to perform the scheduling functions described herein. That is, the scheduler 214 may be associated with a processor.

Furthermore, any of the features of the node 106 may be provided by other systems of the wireless network 100 and any one or more of these features may be provided by other systems or subsystems of the node 106 not specifically discussed herein. For example, the node 106 may not be physically or logically divided in the manner illustrated in FIG. 2. In at least some embodiments, components of the node 106 may be physically or logically separated from one another.

Exemplary Consumer Equipment Device

Figure 3:
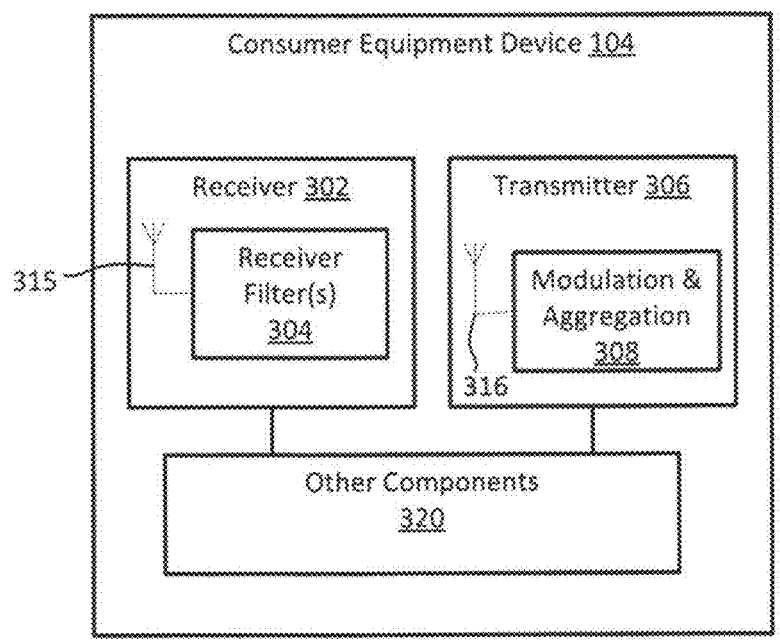
FIG. 3 is a block diagram of an exemplary consumer equipment device in accordance with example embodiments of the present disclosure.

Referring now to FIG. 3, an exemplary consumer equipment device 104 is illustrated. The consumer equipment device 104 illustrates, in block form, some components that may be included in the consumer equipment device 104. It will, however, be appreciated that the consumer equipment device 104 will include other components 320 apart from those specifically discussed herein. For example, as is known, the consumer equipment device 104 may include input and output components such as, for example, a display, a keyboard or keypad, a touchscreen, a speaker, etc.

The consumer equipment device 104 is configured to provide carrier aggregated upstream communications to the wireless network 100 (FIG. 1). More particularly, a transmitter 306 includes a modulation and aggregation component 308 that is configured to prepare a signal for upstream transmission over a transmitter antenna 316. The modulation and aggregation component 308 may be configured to perform modulation and may, in at least some embodiments, aggregate multiple carrier signals to achieve a higher upstream throughput than would be possible without such aggregation function. The transmitter 306 is configured to use resources in accordance with those assigned by the scheduler 214 (FIG. 2). For example, the scheduler 214 may provide the transmitter 306 access to radio resources, such as specific carriers during specific times, and the transmitter 306 may utilize such resources accordingly. For example, the scheduler 214 may provide the transmitter 306 with concurrent use of carriers that may be aggregated without causing a problematic IMD product and the modulation and aggregation component 308 may provide carrier aggregation using those carriers. Since the scheduler 214 is configured to select carriers for aggregation in a manner that avoids problematic IMD products, when carriers are aggregated in accordance with the schedule provided by the scheduler, then problematic IMD products are avoided.

The consumer equipment device 104 also includes a receiver 302 which is associated with a receive antenna 315. It will be appreciated that, while the transmitter antenna 316 and the receiver antenna 315 are illustrated as separate components, in at least some embodiments, a common antenna may be used.

To understand how an IMD product may affect operation of the consumer equipment device 104, it is helpful to discuss receiver pass-bands. The consumer equipment device 104 may be configured to operate over a plurality of bands (such as a plurality of LTE bands). That is, one or more receivers 302 associated with the consumer equipment device 104 may be configured to operate a specific band or set of bands. The bands over which the receiver(s) 302 of the consumer equipment device 104 are configured to operate may be referred to as the pass-bands of the receiver 302. Consumer equipment devices 104 often have receivers 302 that allow such devices to operate over bands apart from those associated with the wireless network 100. That is, even when a consumer equipment device 104 subscribes to a wireless network 100 that does not operate over a particular band, the consumer equipment device 104 may have a receiver 302 that is configured to allow the device to operate over that band. This functionality may be useful, for example, when the consumer equipment device 104 is roaming to allow it to communicate with a different wireless network 100 that may operate over a different band or a different set of bands.

Since the consumer equipment device 104 may be configured to operate over bands and channels that are not always in use, the pass-bands associated with the receiver 302 may be controllable so that some bands (and/or channels) are effectively turned on and some are turned off. For example, one or more receiver filters 304 may control the specific bands (and/or carriers) that the consumer equipment device 104 will monitor. The carrier frequencies that are actively being used for communications between the consumer equipment device 104 and the wireless network 100 (e.g. the bands that the device is monitoring for communications) may be referred to as active pass-bands. That is, the active pass-bands of the receiver are the frequencies that are passed on by the receiver filter(s) 304 without attenuation. The active pass-bands are the downlink frequencies being monitored at the consumer equipment device 104.

When the transmitter of the consumer equipment device 104 transmits a carrier aggregated signal that produces an IMD product, the IMD product may either fall within the active pass-bands or fall outside of the active pass-bands. When the IMD product falls outside of the active pass-bands, then the IMD product is simply ignored and does not cause a problem at the consumer equipment device 104. However, when the IMD product falls inside of the active pass-bands, then the IMD product is not ignored (i.e. is not filtered out at the receiver filter(s) 304) and may thus be referred to as a problematic IMD product.

Exemplary Method of Providing Upstream Communications

Figure 4:
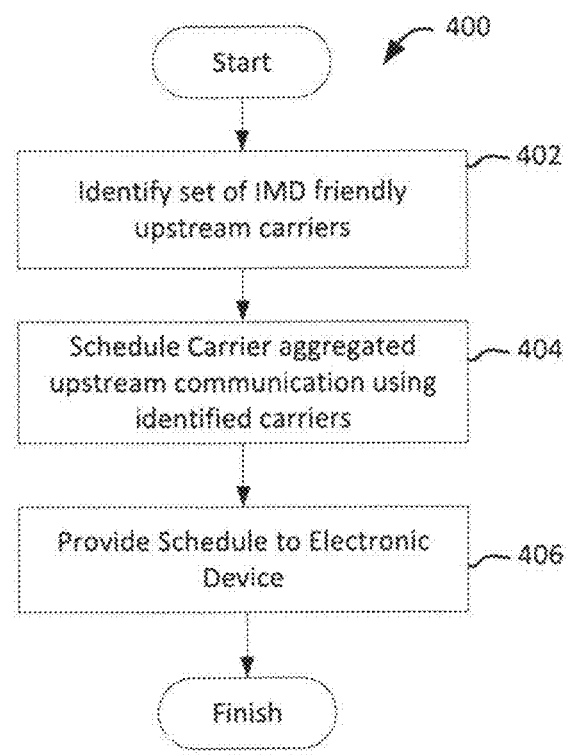
FIG. 4 is a flowchart depicting a method for scheduling a carrier aggregated upstream communication from an electronic device.

FIG. 4 is a flow chart depicting a method 400 of providing upstream communications from an electronic device, such as a consumer equipment device 104, to a wireless network 100

(FIG. 1). The method 400 may be performed by a system that is associated with the wireless network 100. Such system may be referred to as a wireless network system. The wireless network system may, for example, be a node 106 which may, for example, be an eNodeB of the type described herein. In at least some embodiments, the method 400 may be performed by a scheduler 214 (FIG. 2) of the node 106. The scheduler 214 may be of the type described above with reference to FIG. 2. Accordingly, the method 400 may be implemented by one or more components of a wireless network system such as a node 106 and/or a scheduler 214 associated with the wireless network 100. For example, in at least some embodiments, the method 400 may be performed by a processor associated with the node 106 and/or the scheduler 214. The method 400 may be used to provide upstream communications from an electronic device (such as a consumer equipment device 104) to a wireless network.

At 402, a set of intermodulation (IMD) friendly upstream carriers are identified. IMD-friendly carriers are carriers that may be used together for upstream communications without causing an intermodulation product that falls within one or more active pass-bands associated with a receiver of an electronic device that is being used to transmit an upstream communication to the wireless network using these carriers. Accordingly, in at least some embodiments, at 402 a set of carriers that may be used together without causing an intermodulation product that falls within one or more active pass-bands associated with a receiver of the electronic device is identified.

The identification that is performed by the wireless network system is, in at least some embodiments, performed with reference to information that has already been stored in memory associated with the wireless network system. For example, as will be discussed in greater detail below with reference to the method 700 of FIG. 7, in some example embodiments, at 402, information that has previously been stored in memory may be retrieved to determine whether a set of carriers may be used together without causing an intermodulation product that falls within an active pass-band associated with a receiver of the electronic device.

For example, in some embodiments, at 402, band intermodulation product information and/or other categorization information stored in memory associated with the wireless network system is used to identify a set of carriers that may be used together without causing a problematic IMD product.

The band IMD product information may specify whether a particular pair of bands is an IMD friendly band pair or an IMD unfriendly band pair. By way of example, in at least some embodiments, LTE bands 7 and 20 may collectively be considered an IMD unfriendly band pair. Accordingly, band IMD product information may specify that LTE bands 7 and 20 are an IMD unfriendly band pair since they include some carrier combinations that are known to cause a problematic IMD product. By way of further example, in some embodiments, LTE bands 4 and 17 may be collectively considered an IMD unfriendly band pair. Accordingly, band IMD product information may specify that LTE bands 4 and 17 are an IMD unfriendly band pair since they include some carrier combinations that are known to cause a problematic IMD product.

In some embodiments, if a pair of bands (which include a first band and a second band) is considered an IMD unfriendly band pair, then the wireless network system may avoid using carriers from those two bands together for carrier aggregation. That is, in some embodiments, when identifying IMD friendly upstream carriers at 402, the wireless network system may exclude any pair of carriers that include a carrier from the first band and a carrier from the second band. That is, in at least some embodiments, if a pair of bands is considered to be an IMD unfriendly band pair, then inter-band carrier aggregation may not be performed using those bands. Inter-band carrier aggregation occurs when a carrier of one band is aggregated with a carrier of another band. Accordingly, in at least some embodiments, at 402 in order to identify a set of carriers that may be used together without causing a problematic IMD product, the wireless network system may identify an IMD friendly band pair and may select, from that band pair, carriers for inter-band carrier aggregation.

In other embodiments, inter-band carrier aggregation may be achieved by aggregating carriers of an IMD unfriendly band pair. That is, even if a specific carrier that is a member of a first band and a specific carrier that is a member of a second band may cause a problematic IMD product, certain carriers of the first band may be aggregated with certain carriers of the second band without causing a problematic IMD product. Thus, rather than simply assessing IMD product at the band level (i.e. rather than simply determining that a band pair is an IMD unfriendly band pair and refraining from performing carrier aggregation using that band pair), IMD product may be assessed at the carrier level. That is, each carrier of one of the bands of the IMD unfriendly band pair may be evaluated together with each carrier of the other one of the bands of the IMD unfriendly band pair to identify the specific carriers which, when used simultaneously, cause a problematic IMD product. By identifying the pairs (or higher order combinations) of carriers which cause a problematic IMD product when carrier aggregation is performed using those carriers, carrier aggregation using those carrier combination may be avoided, or a special technique may be employed when using the carriers in that carrier combination to avoid the problems associated with the IMD product generated by those carriers. Similarly, the pairs of carriers which are determined not to cause a problematic IMD product when aggregated may be used for carrier aggregation without having to employ one of these special techniques. Thus, evaluating IMD products at the carrier level allows carrier aggregation to be achieved across an IMD unfriendly band pair. The specific carriers that cause the problematic IMD product are not used for upstream carrier aggregation; combinations of carriers that do not cause a problematic IMD product are used. For example, a pair of carriers that does not cause a problematic IMD product when the carriers of that pair are used together may be used during a common time resource in a carrier aggregated upstream communication from a single electronic device.

In at least some embodiments, categorization information may have been stored in memory associated with the wireless network system and used, at 402, when identifying a set of IMD friendly upstream carriers. The categorization information may specify whether a specific set of carriers is IMD friendly or IMD unfriendly. For example, the categorization information may characterize a pair of carriers as either an IMD friendly carrier pair or an IMD unfriendly carrier pair. This characterization will depend, in at least some embodiments, on whether a third order IMD product that is generated when those carriers are used for upstream communication would fall within an active pass-band associated with a receiver of an electronic device communicating using those carriers. If so, then that pair of carriers is IMD unfriendly. If not, then that pair of carriers may be considered IMD friendly.

Accordingly, in at least some embodiments, at 402, a pair (or higher order combination) of IMD friendly carriers is selected based on categorization information stored in memory. The categorization information, in at least some embodiments, indicates whether a pair (or higher order combination) of upstream carriers that are associated with a pair of bands (i.e. the carriers in the pair are each associated with a different band) may be used together without causing an intermodulation product that falls within one or more active pass-bands associated with a receiver of the electronic device. The categorization information may be retrieved from memory and used to identify an IMD friendly carrier pair (or higher order combination).

Accordingly, in at least some embodiments, at 402, information stored in memory may be used in order to identify an IMD friendly carrier combination. In other embodiments, instead of storing such information in memory, such information may be dynamically determined. That is, such information may be determined on the fly at such time as it is required by the scheduler 214. For example, at 402 a pair (or higher order combination) of carriers may be selected and then an IMD product may be calculated based on those carriers. Then, the wireless network system may determine whether the IMD product would fall within an active receiver pass-band on the electronic device using those carriers for upstream carrier aggregation. If so, then, in some embodiments, another pair of carriers may be selected and the IMD product for that carrier pair may be considered. In some embodiments, this process may be repeated until a set of carriers that may be used for carrier aggregation without causing a problematic IMD product is identified. This dynamic process of selecting carriers will be described in greater detail below with reference to FIGS. 5 and 6.

Referring still to FIG. 4, after a pair (or higher order combination) of IMD friendly carriers are identified, at 404, a carrier aggregated upstream communication from the electronic device to the wireless network that uses the identified set of carriers (i.e. the carriers that were identified as being IMD friendly in 402) is scheduled. The carrier aggregated upstream communication is scheduled as an orthogonal frequency division multiplexing (OFDM) communication such as an LTE communication. During carrier aggregation, the carriers identified at 402 may be used concurrently. In at least some embodiments, at 402, inter-band upstream carrier aggregation is scheduled. Inter-band carrier aggregation occurs when one or more carriers of one band are aggregated with one or more carriers of another band.

Accordingly, in at least some embodiments, at 404 resources associated with the wireless network are allocated to permit one electronic device to simultaneously use the carriers in the set of carriers identified at 402 for upstream communications. More particularly, a schedule may be prepared that allocates frequency resources and time resources to a plurality of electronic devices operating in the wireless network. The schedule may allocate the identified set of carriers to a common electronic device during a common time slot. That is, one of the electronic devices operating in the wireless network may be provided with access to the identified set of carriers during a specific window of time and may use that set of carriers for a carrier-aggregated upstream communication during that time slot. That is, the schedule may allow one device to use all carriers of an IMD friendly combination at the same time for the purpose of upstream carrier aggregation. Other network resources may be allocated to other electronic devices during the same window of time. For example, while one electronic device uses a particular set of carriers, another electronic device may use another carrier or set of carriers.

At 406, the schedule may be provided to electronic devices operating within the wireless network (such as consumer equipment devices 104). Accordingly, the schedule is provided to the electronic device which is going to make use of the carriers identified at 402. The electronic device then utilizes frequency and time resources of the wireless network in accordance with the schedule to achieve upstream carrier aggregation.

While the method 400 of FIG. 4 generally described an embodiment in which IMD friendly carrier combinations are used for carrier aggregation and in which IMD unfriendly carrier combinations are avoided, in other embodiments, IMD unfriendly carrier combinations may not be avoided and may, instead, be treated in a different way. More particularly, in some embodiments, the schedule created at 404 may use a combination of carriers that is found to be an IMD unfriendly combination for upstream carrier aggregation but may use a special technique with such combinations that avoids and/or addresses the problematic IMD product.

For example, in some embodiments, the carriers that are included in an IMD unfriendly combination of carriers may be used at a common electronic device, but may be separated by time in such use. That is, at least one carrier in the IMD unfriendly combination may be used with a different time frame. For example, a first carrier may be used in a first time slot of a radio subframe and a second carrier may be used in a second time slot of a radio subframe. Since the carriers are not used concurrently, the IMD product problems are avoided. Accordingly, in some embodiments, the scheduler may make use of an IMD unfriendly carrier combination by generating a schedule in which all carriers in the IMD unfriendly carrier combination may be made available to a single electronic device but in which time separation is used so that concurrent use of all of the carriers in that combination by a single electronic device is avoided. For example, during a first time resource, the electronic device may be scheduled to use a first carrier of the IMD unfriendly combination but not a second carrier of the IMD unfriendly combination and, during a second time resource, the electronic device may be scheduled to use the second carrier of the IMD unfriendly combination but not the first carrier of that combination.

Another technique that allows an IMD unfriendly combination of carriers to be used involves turning off the receiver of the electronic device while the IMD unfriendly combination of carriers is being used for upstream carrier aggregation. That is, while an electronic device utilizes an IMD unfriendly combination of carriers for upstream carrier aggregation, the receiver may be briefly turned off. More particularly, the receiver is turned off during the specific time slot in which the carriers in the IMD unfriendly combination are all used. This technique effectively avoids the reception of the problematic IMD product—the IMD product is still generated, but it is not detected since the receiver is briefly turned off. Accordingly, in at least some embodiments, the scheduler may be configured to generate a schedule that uses an IMD unfriendly carrier combination for upstream carrier aggregation on an electronic device. More particularly, the scheduler generates a schedule which causes the electronic device to turn off its receiver during the specific time slot in which all of the carriers in the IMD unfriendly combination are being used.

A further technique that allows an IMD unfriendly combination of carriers to be used involves allowing all carriers of the IMD unfriendly combination to be used at the same time (i.e. during a common radio subframe time slot) for upstream carrier aggregation from an electronic device, but to ensure that no downstream data packets are sent to that electronic device during that time (i.e. during that radio subframe time slot). That is, the scheduler generates a schedule which provides for an upstream carrier aggregated communication in which all carriers of an IMD unfriendly combination are used at the same time on a single electronic device, but which ensures that no downstream communications are scheduled to be sent to that same electronic device at that time. Accordingly, IMD unfriendly combinations of carriers may be specially handled by the scheduler by scheduling resources to avoid coincident transmission and reception of signals at the consumer equipment device 104 which would suffer IMD problems (i.e. the device that is using the IMD unfriendly carrier combinations for upstream communications).

Thus, in at least some embodiments, the scheduler is configured to generate a schedule that treats IMD friendly carrier combinations differently from IMD unfriendly carrier combinations. More particularly, combinations of carriers that are IMD unfriendly may be handled in a special way. Similarly, the pairs (or higher-order combinations) of carriers which are determined not to cause a problematic IMD product when aggregated (i.e. the carriers of an IMD friendly carrier combination) may be used for carrier aggregation without having to employ one of the techniques that are used to address the IMD problems of IMD unfriendly combinations discussed above. More particularly, all carriers of an IMD friendly carrier combination may be used simultaneously (i.e. during a common time resource) at a single electronic device while the receiver of that electronic device is on and the electronic device is able to receive on all available resource blocks without constraint.

Exemplary Method of Identifying IMD Friendly Carriers

As noted previously, in at least some embodiments, an IMD product may be evaluated at the carrier level to determine whether specific sets of carriers will create a problematic IMD product when they are used for upstream carrier aggregation.

Figure 5:
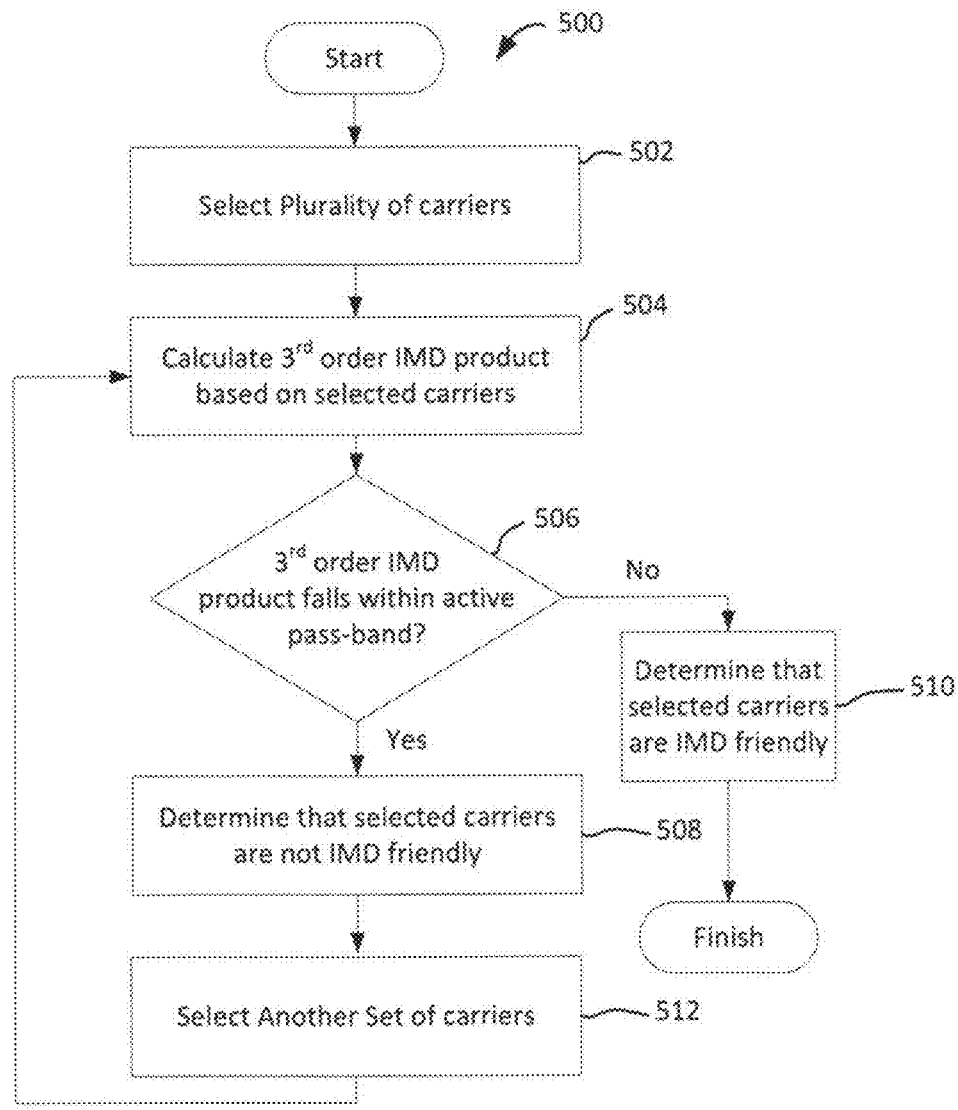
FIG. 5 is a flowchart depicting a method for selecting IMD friendly carriers in accordance with example embodiments of the present disclosure.

Referring now to FIG. 5, a method 500 of identifying IMD friendly carriers that may be used for inter-band carrier aggregated upstream communications will be described. The method 500 may be performed by a system that is associated with the wireless network 100. Such a system may be referred to as a wireless network system. The wireless network system may, for example, be a node 106 which may, for example, be an eNodeB of the type described herein. In at least some embodiments, the method 500 may be performed by a scheduler 214 (FIG. 2) of the node 106. The scheduler 214 may be of the type described above with reference to FIG. 2. Accordingly, the method 500 may be implemented by one or more components of a wireless network system such as a node 106 and/or a scheduler 214 associated with the wireless network 100. For example, in at least some embodiments, the method 500 may be performed by a processor associated with the node 106 and/or the scheduler 214.

In at least some embodiments, the method 500 may be performed at 402 of the method 400 of FIG. 4. That is, the method 500 may be performed when identifying a set of carriers that may be used together for carrier aggregated upstream communications from an electronic device without causing an intermodulation product that falls within one or more active pass-bands associated with a receiver of the electronic device.

At 502, a plurality of carriers are selected by the wireless network system. At least two of the carriers that are selected are from different bands. For example, a first carrier associated with a first LTE band and a second carrier associated with a second LTE band may be selected. These two carriers may be referred to as a carrier pair. As noted above, higher-ordered combinations may be selected in other embodiments.

Then, the wireless network system determines whether the selected carriers create an IMD product that falls within the one or more active pass-bands. More particularly, at 504, the wireless network system calculates a third order IMD product based on the selected carriers. At 504, the wireless network system may calculate all possible third order IMD products. The third order IMD products that are generated by two carriers at frequencies f1 and f2 may be calculated as 2f1+ or −f2 and 2f2+ or −f1. Similarly, third order IMD products that are generated by three carriers at frequencies f1, f2 and f3 may be calculated as:

$$f1 \pm f2 \pm f3$$

And then, at 506, the wireless network system determines whether any of the third order IMD products calculated at 504 fall within the active pass-band(s) of a receiver associated with an electronic device using the selected carriers for upstream carrier aggregation.

The active pass-band(s) of a receiver are, in at least some embodiments, the pass-bands that would be active on an electronic device if that electronic device was communicating using the selected carriers for upstream communications. If the carriers that were selected at 502 were to be used for upstream communications, then the receiver of the electronic device would effectively listen for downstream communications on specific ranges of frequencies, i.e. on related downlink frequencies as determined by the band plan for the active band. These specific ranges of frequencies are considered the active pass-band(s). If the electronic device were to use the selected carriers for upstream communications, then the transmitter of the electronic device would transmit over specific frequencies that correspond to those carriers. These frequencies may be referred to as transmitter frequencies. Then, the active pass-band(s) represent receiver frequencies (i.e. frequencies that are associated with the receiver) corresponding to those transmitter frequencies. Accordingly, in at least some embodiments, the active pass-band(s) used at 506 represent receiver frequencies corresponding to transmitter frequencies that would be in use for transmissions using the selected set of carriers.

If, at 506, it is determined that the third order product(s) do not fall within the active pass-band(s), then at 510, the wireless network system determines that the selected carriers are IMD friendly (i.e. it identifies them as an IMD friendly carrier pair). That is, the wireless network determines that the selected set of carriers may be used together for upstream carrier aggregation without causing a problematic IMD product.

If, however, at 506 it is determined that the third order product(s) do fall within the active pass-band(s), then at 508, the wireless network system determines that the selected carriers are not IMD friendly. That is, the wireless network system determines that the selected carriers are an IMD unfriendly carrier pair.

In at least some embodiments, if it is determined that the selected carriers are IMD unfriendly (i.e. if it is determined that they will cause a problematic IMD product for an electronic device using them for upstream carrier aggregation), then at 512 the wireless network system may select another set of carriers and the steps 504, 506, 508, 510, 512 may be repeated until an IMD friendly carrier pair is identified.

IMD unfriendly combinations of carriers may be avoided, in some embodiments, for the purposes of carrier aggregation. That is, such combinations may not be used together at a single electronic device during a single time slot for carrier aggregation. As noted above, in other embodiments, IMD unfriendly combinations of carriers may be used, but special techniques may be used in order to avoid and/or address the problematic IMD product that may be generated by such IMD unfriendly combinations.

Exemplary Method of Identifying IMD Friendly Carriers

Figure 6:
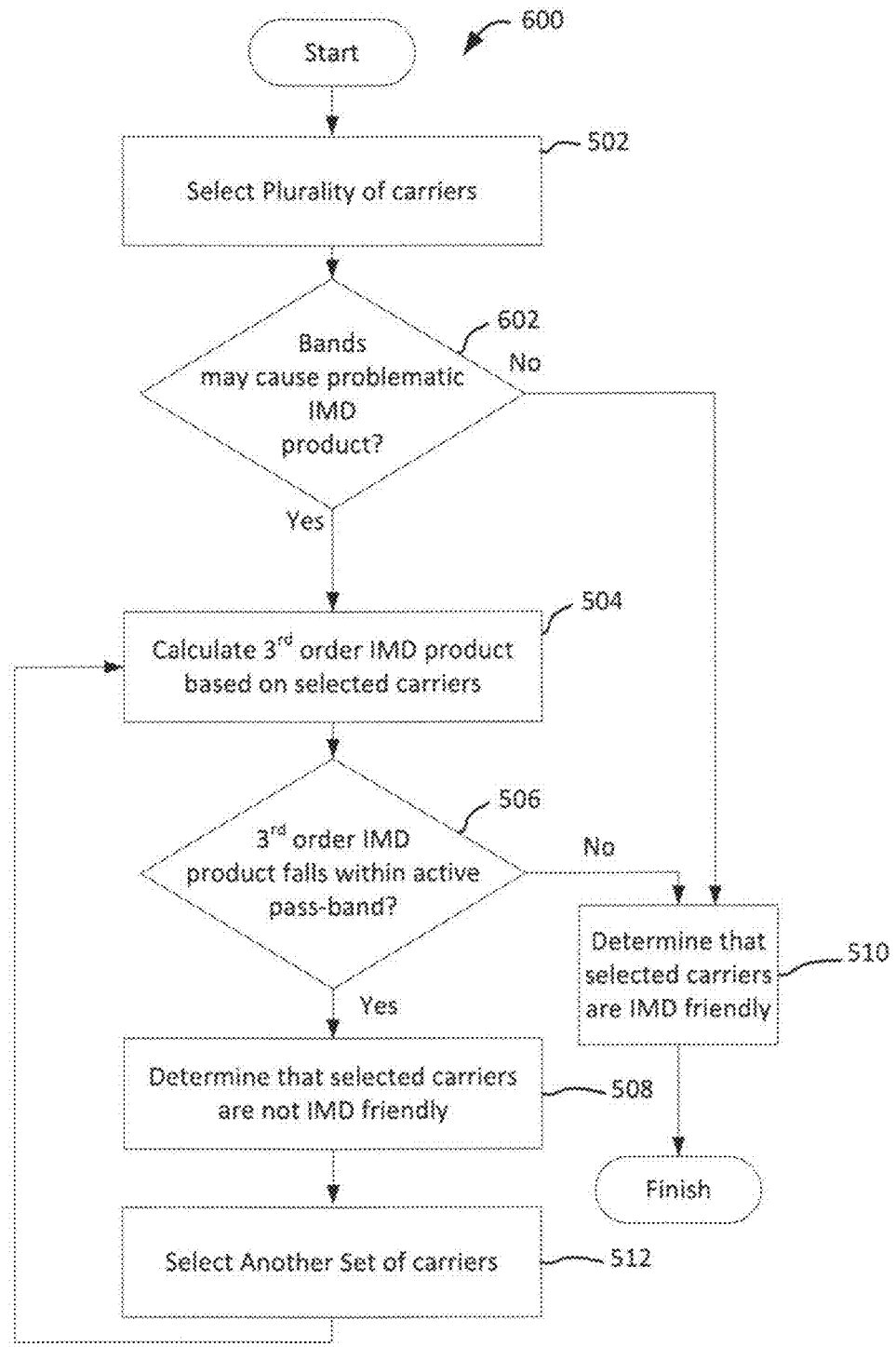
FIG. 6 is a flowchart depicting a method for selecting IMD friendly carriers in accordance with example embodiments of the present disclosure.

Referring now to FIG. 6, an example of a further method 600 of identifying IMD friendly carriers is illustrated. The method includes many features described above with reference to the method 500 of FIG. 5. Common reference numerals have been used to describe such features and the discussion of these features will not be repeated at length.

The method 600 may be performed by a system that is associated with the wireless network 100. Such a system may be referred to as a wireless network system. The wireless network system may, for example, be a node 106 which may, for example, be an eNodeB of the type described herein. In at least some embodiments, the method 600 may be performed by a scheduler 214 (FIG. 2) of the node 106. The scheduler 214 may be of the type described above with reference to FIG. 2. Accordingly, the method 600 may be implemented by one or more components of a wireless network system such as a node 106 and/or a scheduler 214 associated with the wireless network 100. For example, in at least some embodiments, the method 600 may be performed by a processor associated with the node 106 and/or the scheduler 214.

In at least some embodiments, the method 600 may be performed at 402 of the method 400 of FIG. 4. That is, the method 600 may be performed when identifying a set of carriers that may be used together for carrier aggregated upstream communications from an electronic device without causing an intermodulation product that falls within one or more active pass-bands associated with a receiver of the electronic device.

Similar to the method 500 of FIG. 5, the method 600 of FIG. 6 includes, at 502, selecting a plurality of carriers in the manner described above with reference to FIG. 5. 502 is described in greater detail above with reference to FIG. 5. Accordingly, a set of carriers may be selected at 502. At least two of the carriers in the set may, in some embodiments, be from different bands. For example a first carrier may be associated with a first band (such as a first LTE band) and a second carrier may be associated with a second band (such as a second LTE band).

The method 600 of FIG. 6 then considers, at 602 whether the selected carriers are associated with an IMD unfriendly band pair. That is, at 602, the wireless network system determines if the selected carriers are included in bands that may be associated with an intermodulation product when used together for carrier aggregation. This determination may be made by reference to band intermodulation product information stored in memory associated with the wireless network system.

The band IMD product information specifies whether a particular pair of bands is an IMD friendly band pair or an IMD unfriendly band pair. By way of example, in at least some embodiments, LTE bands 7 and 20 may collectively be considered an IMD unfriendly band pair. Accordingly, band IMD product information may specify that LTE bands 7 and 20 are an IMD unfriendly band pair since they include some carrier combinations that are known to cause a problematic IMD product. By way of further example, in some embodiments, LTE bands 4 and 17 may be collectively considered an IMD unfriendly band pair. Accordingly, band IMD product information may specify that LTE bands 4 and 17 are an IMD unfriendly band pair since they include some carrier combinations that are known to cause a problematic IMD product.

Notably, in at least some embodiments, a band pair that includes a first band and a second band is considered to be an "IMD unfriendly band pair" if any pair of carriers that includes one upstream carrier associated with the first band and one upstream carrier associated with the second band causes a problematic IMD product at an electronic device when that pair of carriers are used in a carrier aggregated upstream communication from that electronic device. Under this definition, an IMD unfriendly band pair may include a pair (or higher order combination) of carriers (e.g. consisting of one upstream carrier associated with the first band and one upstream carrier associated with the second band) that will not cause a problematic IMD product at an electronic device when used in a carrier aggregated upstream communication from that electronic device. That is, even though some combinations of carriers may create problematic IMD products, not all combinations of carriers may create problematic IMD products.

Accordingly, in at least some embodiments, if it is determined (at 602) that the carriers selected at 502 are associated with an "IMD unfriendly band pair", then the method 600 may continue to 504 where further investigations may be performed to determine whether the specific carriers that were selected will cause a problematic IMD product. That is, when it is determined (based, for example, on stored band intermodulation product information), that the selected carriers are included in bands that may be associated with a problematic IMD product when used together for carrier aggregation, then the method 600 may attempt to identify whether the specific carrier pair (or higher order combination) is IMD friendly. As described with respect to the method 500 of FIG. 5, at 504, the third order IMD product may be determined and used, at 506, to determine whether the third order IMD product falls within an active pass-band. If so, then at 508 the wireless network system determines that the selected carriers are not IMD friendly (i.e. that they are IMD unfriendly) and another set of carriers is selected at 512, after which point the method 600 may resume at 504 or 602. If, at 506, it is determined that the third order IMD product does not fall within an active pass-band, then at 510 a determination may be made that the selected carriers are IMD friendly. At this point, an IMD friendly carrier pair (or higher order combination) has been identified and the method 600 may stop.

If, however, at 602, it is determined that the bands are not bands that may cause a problematic IMD product (i.e. if the bands are determined to be IMD friendly bands), then carrier level investigations (of whether a problematic IMD product will be created) are unnecessary. Accordingly, in such circumstances, the third order IMD product may not be calculated based on the carriers (i.e. 504 may not be performed) and the method may proceed to 510 where the wireless network system determines that the selected carriers are IMD friendly.

In the method 600 of FIG. 6, a two-stage analysis is performed to determine whether a carrier pair (or higher order combination) is going to create a problematic IMD product when used for upstream carrier aggregation. First, an analysis is done at the band-level (i.e. a determination is made as to whether the bands involved are known to sometimes create problematic IMD products when used together for inter-band upstream carrier aggregation). Depending on the result of the band-level analysis, a carrier level analysis may be performed. If the bands are known to sometimes create problematic IMD products, then the wireless network system determines whether the specific set of carriers involved will create a problematic IMD product. Since many band pairs are IMD friendly band pairs, this two stage process may result in a speed increase over the method 500 of FIG. 5.

Exemplary Method of Storing Categorization Information

As noted above, in some embodiments, the wireless network system may dynamically determine whether carriers are going to cause a problematic IMD product when scheduling upstream communications. That is, the wireless network system may calculate the third order IMD product during the scheduling operations. In other embodiments, such information may be pre-calculated. That is, the third order IMD product for a pair of carriers may be pre-calculated and, in some embodiments, the determination as to whether a carrier pair is IMD friendly or IMD unfriendly is made well in advance of any scheduling. In such embodiments, memory associated with the wireless network subsystem may store information regarding a carrier pair (or higher order combination). For example, in some embodiments, the IMD product for a pair (or higher order combination) of carriers is stored. In some embodiments, categorization information is stored for a carrier pair (or higher order combination). The categorization information indicates whether a -carrier pair (or higher order combination) is IMD friendly or IMD unfriendly. As noted in the discussion of 402 in FIG. 4, this information may later be retrieved during the scheduling procedure.

An overview having been provided, reference will now be made to FIG. 7 which illustrates a method 700 of storing categorization information for carriers.

Figure 7:
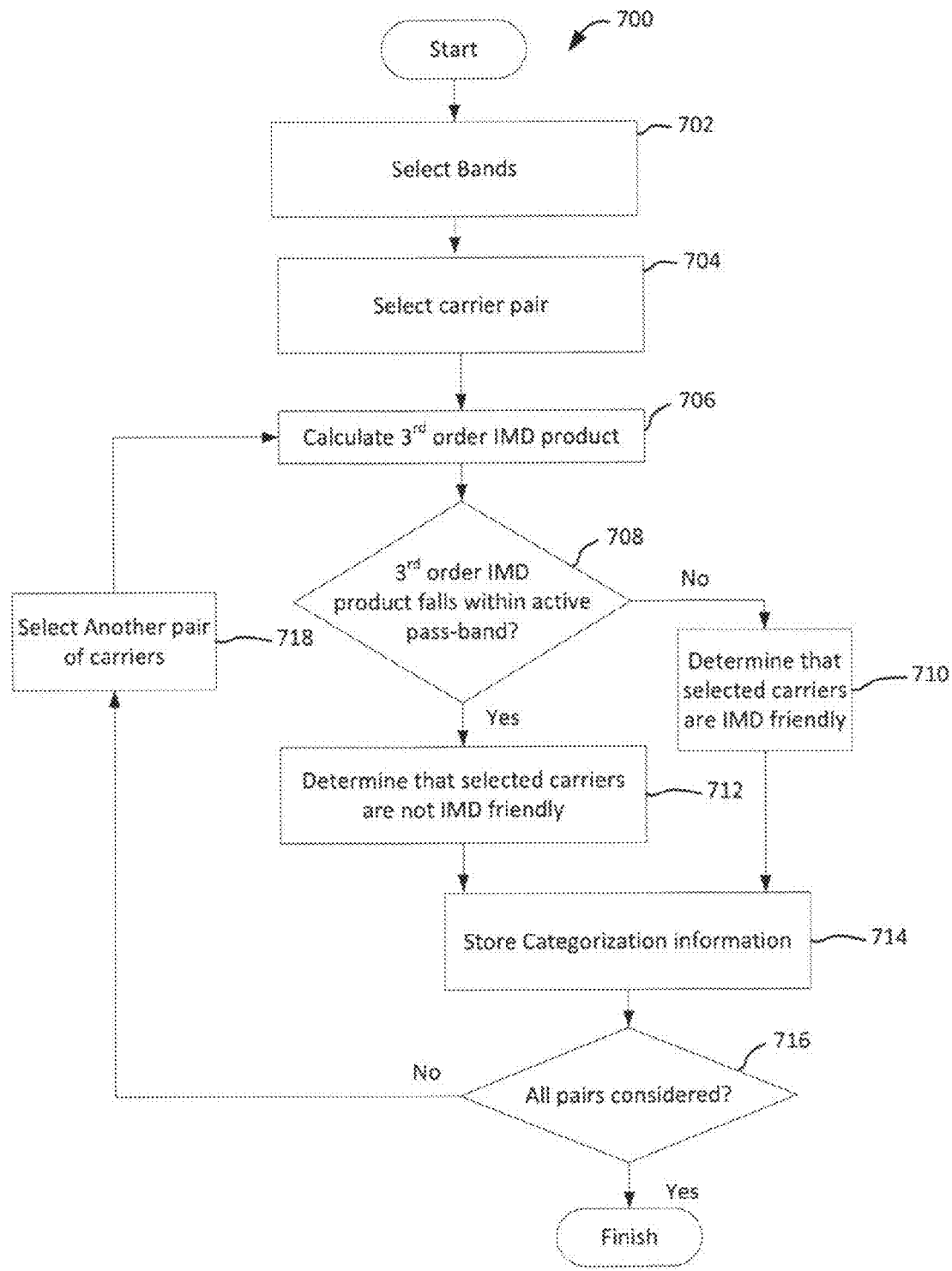
FIG. 7 is a flowchart depicting a method for categorizing carriers in accordance with example embodiments of the present disclosure.

Referring now to FIG. 7, at 702 the wireless network system may select a plurality of bands. In at least some embodiments, the wireless network system may select a band pair (i.e. two separate bands). The bands may be LTE bands. Each band is associated with a plurality of upstream carriers that may be used for upstream communications within that band.

In at least some embodiments, the bands may be selected with reference to band intermodulation product information stored in memory. More particularly, such information may be used to select two bands that may be associated with an IMD product when used together for carrier aggregation. That is, in at least some embodiments, at 702 bands are selected that are known to sometimes cause a problematic IMD product when used together (i.e. an IMD unfriendly band pair is selected). By way of example, in some embodiments, LTE bands 7 and 20 may be selected. By way of further example, in some embodiments, LTE bands 4 and 17 are selected. The bands that are selected may be referred to below as a first band and a second band.

At 704, a carrier pair (or higher order combination) that includes at least one carrier from each of the selected bands is selected. In some embodiments, one carrier from the first band is selected and one carrier from the second band is selected.

Then, at 706, a third order IMD product is determined based on the selected carriers. 706 may be performed in the same manner as 504 of the methods 500, 600 of FIGS. 5 and 6.

Then, at 708, the wireless network system determines whether the third order intermodulation product falls within an active pass-band. 708 may be performed in the same manner as 506 of the methods 500, 600 of FIGS. 5 and 6. As described above with reference to FIGS. 5 and 6, the active pass-band may represent receiver channels corresponding to transmitter channels that would be in use for transmissions using the selected set of carriers.

If, at 708, it is determined that the third order product(s) do not fall within the active pass-band(s), then at 710, the wireless network system determines that the selected carriers are IMD friendly (i.e. it identifies them as an IMD friendly carrier pair (or higher order combination)). That is, the wireless network determines that the selected set of carriers may be used together for upstream carrier aggregation without causing a problematic IMD product.

If, however, at 708 it is determined that the third order IMD product(s) do fall within the active pass-band(s), then at 712, the wireless network system determines that the selected carriers are not IMD friendly. That is, the wireless network system determines that the selected carriers are an IMD unfriendly carrier pair (or higher order combination).

Accordingly, based on the result at 708, the wireless network system may categorize the pair of upstream carriers as either an intermodulation-friendly carrier pair (or higher order combination) (at 710) or an intermodulation-unfriendly carrier pair (or higher order combination) (at 712). This categorizing is performed based on the determination as to whether the third order intermodulation product falls within the active pass-band (i.e. based on the result of 708).

After categorizing the carriers, at 714 the wireless network system stores categorization information in memory based on the categorizing. More particularly, information is stored that indicates whether the selected carrier pair (or higher order combination) is IMD friendly or IMD unfriendly. This information may, for example, be stored as a black list (i.e. a list of carrier pairs that should not be used together) or as a white list (i.e. a list of carrier pairs that may be used together). The information may be stored in other formats in other embodiments.

In at least some embodiments, at 716, a determination may then be made regarding whether all of the carrier pairs consisting of at least one carrier from each of the currently selected bands have been considered. That is, at 716 the wireless network system determines whether all carrier pairs from the selected bands that may be used for inter-band carrier aggregated upstream communications have been considered. If so, then the method 700 ends. If some such carriers have not yet been selected, then at 718 another pair of carriers may be selected based on the currently selected bands. That is, a pair of carriers that consist of at least one carrier from the first band and one carrier from the second band and that have not yet been evaluated in the method 700 are selected.

The evaluation steps 706, 708, 710, 712, 714 are then repeated for the newly selected pair of carriers. Accordingly, the steps of calculating (706), determining (712), categorizing (710, 712) and storing (714) are performed for a plurality of pairs (or higher order combinations) of upstream carriers that consist of at least one upstream carrier from each of the selected bands. More particularly, these steps may be performed for each pair of upstream carriers that consists of one upstream carrier from each of the selected bands.

By repeatedly performing the steps noted above, the categorization information stored in memory may be comprehensive for the selected band pair. That is, the categorization information indicates which upstream carrier pairs may be used for inter-band upstream carrier aggregation.

This information may then be used (at 402 of the method 400 of FIG. 4) by the wireless network system in order to identify a carrier pair that may be used concurrently from a single electronic device for upstream carrier aggregated communications without causing a problematic IMD product. That is, when identifying a set of carriers that may be used together without causing an intermodulation product that falls within one or more active pass-bands associated with a receiver of the electronic device, the wireless network system may use the categorization information to identify an intermodulation-friendly carrier pair. Such information may be retrieved from memory during the scheduling process of the method 400 of FIG. 4.

When performing scheduling using the categorization information stored at 714, the wireless network system may, in some embodiments, perform a two-stage process of the type described in the method 600 of FIG. 6. More particularly, the wireless network system may first determine, with reference to band IMD product information stored in memory, whether a carrier pair is included in an IMD unfriendly band pair. If the carriers are included in an IMD friendly band pair, then the wireless network system may proceed to schedule a carrier aggregated upstream communication using those carriers. If, however, the carriers are included in an IMD unfriendly band pair, then the wireless network system may consider categorization information for those carriers. That is, the categorization information may be used to determine whether those specific carriers generate a problematic IMD product when used together for an upstream carrier aggregated communication.

As noted above, while the methods described above have generally described methods by which carriers that are known to produce an IMD product are not used with carrier aggregation, in at least some embodiments, a pair (or higher order combination) of carriers that produces a problematic IMD product may be used during a single upstream communication session on an electronic device. For example, as noted above, in some such embodiments, at least one carrier in the pair (or higher order combination) may be used with a different time resource. That is, a first carrier may be used in a first time slot and a second carrier may be used in a second time slot. Since the carriers are not used concurrently, the IMD product problems are avoided.

Furthermore, while the methods described above have generally considered whether a pair of carriers will cause a problematic IMD product, higher order combinations may be considered in other embodiments. For example, in some embodiments, the electronic device may consider whether combinations of carriers having three members will result in a problematic IMD product. For example, during steps 502 and/or 512 of the method 500 of FIG. 5 or the method 600 of FIG. 6 or during 704 and/or 718 of the method 700 of FIG. 7, a higher ordered set of carriers may be selected (instead of a pair). For example, in some embodiments, two carriers associated with a first band and one carrier associated with a second band may be selected. Then, at 504 of the methods 500 or 600 or at 706 of the method 700, the third order IMD products may be calculated based on the three carriers that were selected. By comparing the third order IMD products to the active pass-band (in the manner described above with reference to 506 and 708), a determination may be made as to whether the selected three carriers may be used together for carrier aggregation of an upstream signal sent from a single electronic device without causing a problematic IMD product at that electronic device. If so (i.e. if that combination is IMD friendly), then the combination may be used concurrently for upstream carrier aggregation at an electronic device. That is, all carriers from that combination may be used at during a common time resource at a single electronic device.

However, if the higher order combination is IMD unfriendly, then the combination may not be used concurrently for carrier aggregation at a single electronic device or a special technique of the type described above may be employed to avoid and/or address the problematic IMD product (e.g., the time separation techniques described above may be employed and/or the receiver may be turned off during the specific window of time in which the carriers of the IMD unfriendly pair are used together).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method, performed by a wireless network system associated with a wireless network, the method comprising:
   identifying one or more sets of carriers that, when used together, do not generate an intermodulation product that falls within one or more active pass-bands associated with a receiver of an electronic device by:
      selecting two bands, each band being associated with a plurality of upstream carriers to use for upstream communications within said band, the upstream communication being an orthogonal frequency division multiplexing communication;
      for a plurality of pairs of upstream carriers that consists of one upstream carrier from each band:
         calculating a third order intermodulation product;
         determining whether the third order intermodulation product falls within the active pass-band, the active pass-band representing receiver channels corresponding to transmitter channels that would be in use for transmissions using a selected set of carriers;
         categorizing a pair of upstream carriers as an intermodulation-friendly carrier pair or an intermodulation-unfriendly carrier pair based on the determination as to whether the third order intermodulation product falls within the active pass-band; and
         storing categorization information in memory based on the categorizing.

2. The method of claim 1, further comprising, prior to determining whether the third intermodulation product falls within the active pass-band:
   determining, with reference to band intermodulation product information stored in memory, that the selected carriers are included in bands that are associated with a problematic intermodulation product when used together for carrier aggregation.

3. The method of claim 1, further comprising:
   scheduling a carrier aggregated upstream communication from the electronic device to the wireless network using one of the identified sets of carriers.

4. The method of claim 1, wherein the steps of calculating, determining, categorizing and storing are performed for each pair of upstream carriers that consists of one upstream carrier from each band.

5. The method of claim 1, wherein identifying a set of carriers that when used together, do not generate an intermodulation product that falls within one or more active pass-bands associated with a receiver of the electronic device comprises:
   using the categorization information to identify an intermodulation-friendly carrier pair.

6. The method of claim 1, wherein selecting two bands comprises:

selecting, with reference to band intermodulation product information stored in memory, two bands that may be associated with an intermodulation product when used together for carrier aggregation.

7. The method of claim 6, wherein the selected bands are LTE bands 7 and 20.

8. The method of claim 6, wherein the selected bands are LTE bands 4 and 17.

9. The method of claim 1, wherein identifying a set of carriers that when used together, do not generate an intermodulation product that falls within one or more active pass-bands associated with a receiver of the electronic device further comprises retrieving the categorization information from memory, the categorization information indicating whether a pair of upstream carriers associated with a plurality of bands can be used together without causing an intermodulation product that falls within one or more active pass-bands associated with a receiver of the electronic device.

10. The method of claim 3, where scheduling a carrier aggregated upstream communication from the electronic device to the wireless network using the identified set of carriers comprises generating a schedule in which the electronic device is scheduled to use all of the identified carriers in one of the sets at the same time for upstream carrier aggregation, and wherein the schedule also allows a downstream signal to be transmitted to that electronic device during that same time.

11. The method of claim 1, further comprising:
identifying a set of IMD unfriendly carriers, the set of IMD unfriendly carriers including carriers that cause an intermodulation product that falls within one or more active pass-bands associated with a receiver of the electronic device when all carriers in the set are used together for upstream carrier aggregation; and
scheduling an upstream communication to the wireless network by generating a schedule in which a single electronic device uses all carriers in the set of IMD unfriendly carriers for the upstream communication but in which time separation is used so that the IMD unfriendly carriers are not all used at the same time at that electronic device.

12. The method of claim 1, further comprising:
identifying a set of IMD unfriendly carriers, the set of IMD unfriendly carriers including carriers that cause an intermodulation product that falls within one or more active pass-bands associated with a receiver of the electronic device when all carriers in the set are used together for upstream carrier aggregation; and
scheduling an upstream communication to the wireless network by generating a schedule in which all carriers in the set of IMD unfriendly carriers are used by a single electronic device carriers during a common time slot for the upstream communication but in which the electronic device is scheduled to turn off its receiver during that time slot.

13. The method of claim 1, further comprising:
identifying a set of IMD unfriendly carriers, the set of IMD unfriendly carriers including carriers that cause an intermodulation product that falls within one or more active pass-bands associated with a receiver of the electronic device when all carriers in the set are used together for upstream carrier aggregation; and
scheduling an upstream communication to the wireless network by generating a schedule in which a single electronic device uses all carriers in the set of IMD unfriendly carriers during a time slot but in which no downstream communications are scheduled to that electronic device during the time slot.

14. A wireless network, system comprising:
a memory, wherein said communicating with a processor, the processor configured to:
identify one or more sets of carriers that, when used together, do not generate an intermodulation product that falls within one or more active pass-bands associated with a receiver of an electronic device by:
selecting two bands, each band being associated with a plurality of upstream carriers to use for upstream communications within said band, the upstream communication being an orthogonal frequency division multiplexing communication;
for a plurality of pairs of upstream carriers that consists of one upstream carrier from each band:
calculating a third order intermodulation product;
determining whether the third order intermodulation product falls within the active pass-band, the active pass-band representing receiver channels corresponding to transmitter channels that would be in use for transmissions using the selected set of carriers;
categorizing the pair of upstream carriers as an intermodulation-friendly carrier pair or an intermodulation-unfriendly carrier pair based on the determination as to whether the third order intermodulation product falls within the active pass-band; and
storing categorization information in memory based on the categorizing.

* * * * *